United States Patent [19]
de Queiroz et al.

[11] Patent Number: 5,799,112
[45] Date of Patent: Aug. 25, 1998

[54] METHOD AND APPARATUS FOR WAVELET-BASED UNIVERSAL HALFTONE IMAGE UNSCREENING

[75] Inventors: Ricardo L. de Queiroz, Fairport; Jiebo Luo, Rochester; Zhigang Fan, Webster, all of N.Y.

[73] Assignee: Xerox Corporation, Stamford, Conn.

[21] Appl. No.: 708,014

[22] Filed: Aug. 30, 1996

[51] Int. Cl.$^6$ .............................. G06T 5/00; H04N 1/405
[52] U.S. Cl. .................. 382/254; 382/261; 382/263; 382/264; 358/456; 358/447
[58] Field of Search .......................... 382/260, 261, 382/263, 264, 254; 358/456, 447

[56] References Cited

U.S. PATENT DOCUMENTS

| | | |
|---|---|---|
| 4,630,125 | 12/1986 | Roetling . |
| 5,027,078 | 6/1991 | Fan .............................. 358/456 |
| 5,243,444 | 9/1993 | Fan .............................. 358/456 |
| 5,339,170 | 8/1994 | Fan .............................. 358/456 |
| 5,343,309 | 8/1994 | Roetling ........................ 382/261 |

*Primary Examiner*—Scott Rogers
*Attorney, Agent, or Firm*—Oliff & Berridge, PLC

[57] ABSTRACT

A universal halftone image unscreening method includes: 1) decomposing the halftone image into a plurality of subband image levels, where each subband image level includes a plurality of subband images; 2) selectively filtering the plurality of subband images of each subband image level; and 3) recomposing the plurality of filtered subband images into a continuous tone image. The continuous tone image can then be further filtered to enhance its appearance. The subband images are preferably formed using the discrete wavelet transform, but can be formed using any known transform. The subband images are selectively filtered using a non-edge areas noise attenuating filter and a plurality of oriented filters. The halftone image is preferably decomposed using an N-stage halftone image decomposer, wherein each of the N decomposer stages comprises a set of low-pass and high-pass filters. Similarly, the continuous tone image is preferably recomposed using an N-stage continuous tone image recomposer, wherein each of the N recomposer stages comprises a set of low-pass and high-pass filters. The universal halftone unscreening method and apparatus are able to unscreen any halftone image to form the continuous tone image without needing any information about the halftone image halftoning process, and are able to unscreen both original, electronically stored, halftone image data and printed halftone images which have been scanned to generated the electronic image data.

28 Claims, 16 Drawing Sheets

METHOD AND APPARATUS FOR WAVELET-BASED UNIVERSAL HALFTONE IMAGE UNSCREENING

BACKGROUND OF THE INVENTION

1. Field of the Invention

This invention relates to methods and apparatus for converting a halftone image generated from an original continuous tone image back into a continuous tone image. In particular, this invention is directed to methods and apparatus which use wavelet-based techniques and which are able to generate high-quality continuous tone images from halftone images independently of the halftone technique and any knowledge of the halftone technique.

2. Description of the Related Art

Halftoning refers to generating a binary, or two-tone, image from a continuous tone, or contone or grayscale, image. In general, grayscale images refer to continuous tone black (or some other single color) and white images, while contone images can be either full color images or single-color and white images. In either case, a halftone image is generated from a contone (full color or grayscale) image using any one of a variety of halftoning techniques. These various techniques include: 1) threshold arrays or dithering, such as clustered dots, dispersed dots and stochastic screens; 2) adaptive processes, such as error diffusion; and 3) interactive processes, such as least squares and direct binary search. It should be appreciated that this list is not exhaustive.

It should also be appreciated that halftoning is a many-to-one process. That is, regardless of the particular halftoning technique used, many variations of the original contone image will result in the same halftone image.

Unscreening refers to the process for "undoing" the halftoning of an original contone image. More precisely, unscreening refers to creating a contone image from an original halftone image. Because halftoning is a many-to-one process, unscreening is generally a one-to-many process. That is, any one of a number of variations of the resulting contone image can be created by the unscreening process from the original halftone image.

The goal of unscreening is thus to generate an unscreened contone image which most closely approximates the original contone image from which the original halftone image was itself created. Previous unscreening techniques have therefore been developed based on the particular halftone techniques used to create the original halftone images. That is, each previous unscreening technique was designed specifically to unscreen a halftone image created using a particular halftone technique.

For example, in "Inverse Halftoning and Kernel Estimation for Error Diffusion" by P. W. Wong, IEEE Transactions on Image Processing, Vol. 4, No. 4, pp. 486–498, April 1995, three iterative methods for unscreening error-diffused halftone images are disclosed. These iterative methods are: 1) linear filtering and statistical smoothing; 2) minimum mean square error (MMSE) projection; and 3) maximum a priori probability (MAP) projection. Each of these iterative methods is based on features that are present in error-diffused halftone images. If the halftone image to be unscreened was not formed from the original contone image by error diffusion, then these methods will not be appropriate, as they will generate poor quality contone images from a non-error-diffused halftone image.

For example, the MAP projection unscreening technique disclosed by Wong, in Algorithms 2 and 3 on pages 494 and 496, respectively, is able to unscreen an error-diffused halftone image without any a priori knowledge of the error diffusion kernel used to create the error-diffused halftone image. However, the MAP projection unscreening technique assumes that halftone image has been formed by error diffusion. Thus, a system which implements the MAP projection unscreening technique must either be supplied only with error-diffused halftone images or include a gatekeeper for rejecting any non-error-diffused halftone images. Otherwise, if such a system were supplied with a halftone image formed by, for example, a clustered dots technique, there would be no error diffusion kernel embedded in the halftone image for the MAP projection unscreening system to estimate and use to unscreen the image. Thus, such a system, when operating on such a non-error-diffused halftone image, probably would not meet the requirements of step 5 of Algorithm 2 and therefore may become stuck in an endless loop.

Other systems, directed to unscreening dithered halftone images, are disclosed in "Inverse Halftoning" by C. M. Miceli et al., J. Electron. Imaging, vol. 1, pp 143–151, April 1992; "Retrieval of Gray Images From Digital Halftones" by Z. Fan, Proc. ISCAS, pp. 2477–2480, May 192; "New Results On Reconstruction of Continuous-Tone From Halftone" by A. Analoui et al., Proc. ICASSP, vol. III, pp. 313–316, March 1992; and "Descreening Via Linear Filtering and Iterative Techniques" by R. S. Kern et al., Proc. SPIE, vol. 1913, pp. 299–309, February 1993. In particular, each of the unscreening techniques disclosed in these papers operate in the spatial domain and use low-pass filtering with various ones of impulse removal (Miceli), logic filtering (Fan), projection on convex sets (Analoui) and successive approximation (Analoui and Kern).

Other unscreening techniques for dithered and/or error-diffused halftone images are disclosed in "Halftone to Continuous-Tone Conversion of Error-Diffusion Coded Images" by S. Hein et al., IEEE Trans. Image Processing, Vol. 4, pp 208–216, February 1995; "A Bayesian Approach to Palette Restoration" by S. M. Schweizer et al., Proc. SPIE, vol. 1913, pp. 282–292; and "Error Diffused Image Compression Using a Halftone-to-Grayscale Decoder and Predictive Pruned Tree-Structured Vector Quantization" by M. Y. Ting et al., IEEE Trans. Image Processing, Vol. 3, pp. 854–858, November 1994. In particular, Hein poses the unscreening problem as a quadratic programming problem where the mean square error is minimized. In Schweizer, a statistical approach is applied to reconstruct continuous tone images from both dithered and error-diffused halftone images. In Ting, unscreening of error-diffused halftone images is performed using a look-up table based on vector quantization techniques. However, none of the unscreening techniques outlined above operates independently of any information about the halftone image.

In addition, many, if not all, of the unscreening techniques outlined above operate based on the spatial distribution of the binary halftone values. One practical use of unscreening is to recover an electronic contone image from an electronic halftone image obtained by scanning a printed halftone image of a document, such as a newspaper, a magazine or a book. In this case, the halftone image has been scanned to create the electronic halftone image. However, because it is extremely unlikely that the spatial resolution of the halftone image exactly matches the spatial resolution of the scanner, the scanner spatially filters the halftone image when creating the electronic halftone image. Thus, when unscreening a scanned halftone image, the unscreening technique must distinguish or otherwise separate the halftone values resulting from the halftoning process from the values resulting from spatially filtering the halftone image during scanning.

Accordingly, there is a need for a universal unscreening technique which operates independently of any knowledge about the halftoning process which created the halftone image to be unscreened, including the type of halftoning process. There is furthermore a need for a universal unscreening technique which operates independently of whether the halftone image to be unscreened has been scanned.

SUMMARY OF THE INVENTION

This invention therefore provides an unscreening method and apparatus for unscreening an arbitrary halftone image independently of any knowledge concerning the halftoning process which formed the arbitrary halftone image, including the type of halftoning process.

This invention further provides an unscreening method and apparatus for unscreening an arbitrary halftone image independently of whether the halftone image has been scanned.

This invention thus provides a wavelet-based universal unscreening method and apparatus.

This invention further provides a method and apparatus for selectively processing a halftone image using a series of spatial and frequency filters which preserves most of the original image content while eliminating halftone noise.

This invention additionally provides a method and apparatus for non-linearly filtering the resulting contone image to create a final contone image.

This invention still further provides a method and apparatus which is independent of parameter estimation and is thus universal to all types of halftoned images, including scanned halftoned images.

In particular, the method of this invention includes:

decomposing the original halftone image into a plurality of subband images;

attenuating noise from non-edge areas of each of the plurality of subband images;

oriented filtering of each of the plurality of noise-attenuated subband images;

recomposing the plurality of oriented-filtered and noise-attenuated subband images into an initial contone image; and filtering the initial contone image using a non-linear, edge-preserving filter to form a final contone image.

Furthermore, the decomposing step of the method of this invention includes decomposing the original halftone image into a plurality of different frequency subband images based on a discrete wavelet transform. The decomposing step additionally includes decomposing one of the plurality of upper level different frequency subband images into a plurality of lower level different frequency subband images, and repeating the upper level subband image decomposing step a plurality of times.

The noise-attenuating step includes clipping the magnitudes of the pixels of the high frequency subband images of each level, and further includes weighing the magnitudes of the parent subband image for each level of subband images and clipping the magnitudes of the high frequency subband images to at most the weighted magnitude of their parent band. Furthermore, the weighing varies from level to level. Additionally, the clipping step is adaptive to edges in the high frequency subband images.

The oriented filtering step includes applying a one-dimensional low-pass filter along an orientation of each subband image. In particular, a horizontal low-pass filter is applied to the vertical subband images, while a vertical low-pass filter is applied to the horizontal subband images and a X-shaped low-pass filter is applied to the diagonal subband images. The oriented filtering step further includes adapting the filtering to the resolution of the subband images. The oriented filtering step additionally includes selecting appropriate filters based on estimates of the screen parameters.

The initial contone image filtering step includes non-linearly filtering the initial contone image using spatial smoothness constraints modeled using a Huber Markov random field (HMRF), and may include non-linearly filtering the initial contone image using edge-preserving methods, such as σ-filter based filtering, in place or in addition to filtering using the HMRF spatial smoothness constraints.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein.

DESCRIPTION OF THE PREFERRED EMBODIMENT

Figure 1:
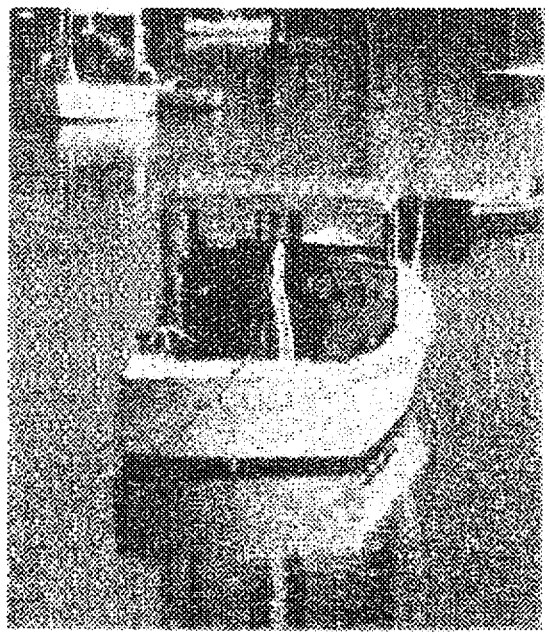
FIG. 1 is an error diffused halftone image.
Figure 2:
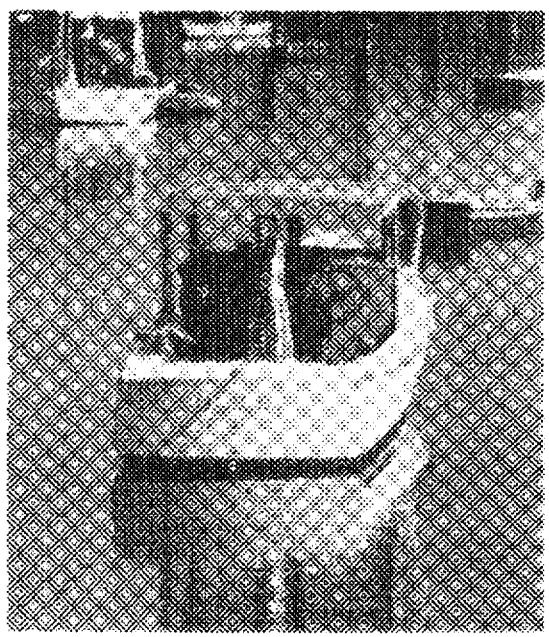
FIG. 2 is a 3×3 clustered dots halftone image.
Figure 23:
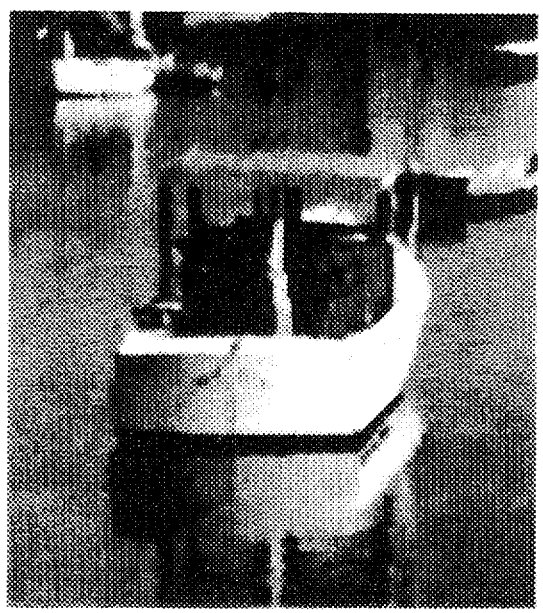
FIG. 23 shows the final continuous tone image of FIG. 22 after nonlinear filtering.
Figure 24:
FIG. 24 shows the final continuous tone image of the error diffused halftone image of FIG. 1.

This invention is directed to converting halftone images, such as those shown in FIGS. 1 and 2, into continuous tone, or "contone", images, such as those shown in FIGS. 23 and 24. FIG. 1 shows a 400×400 pixel error diffused halftone image. FIG. 2 shows the same image formed by 3×3 clustered dot halftoning.

Figure 3:
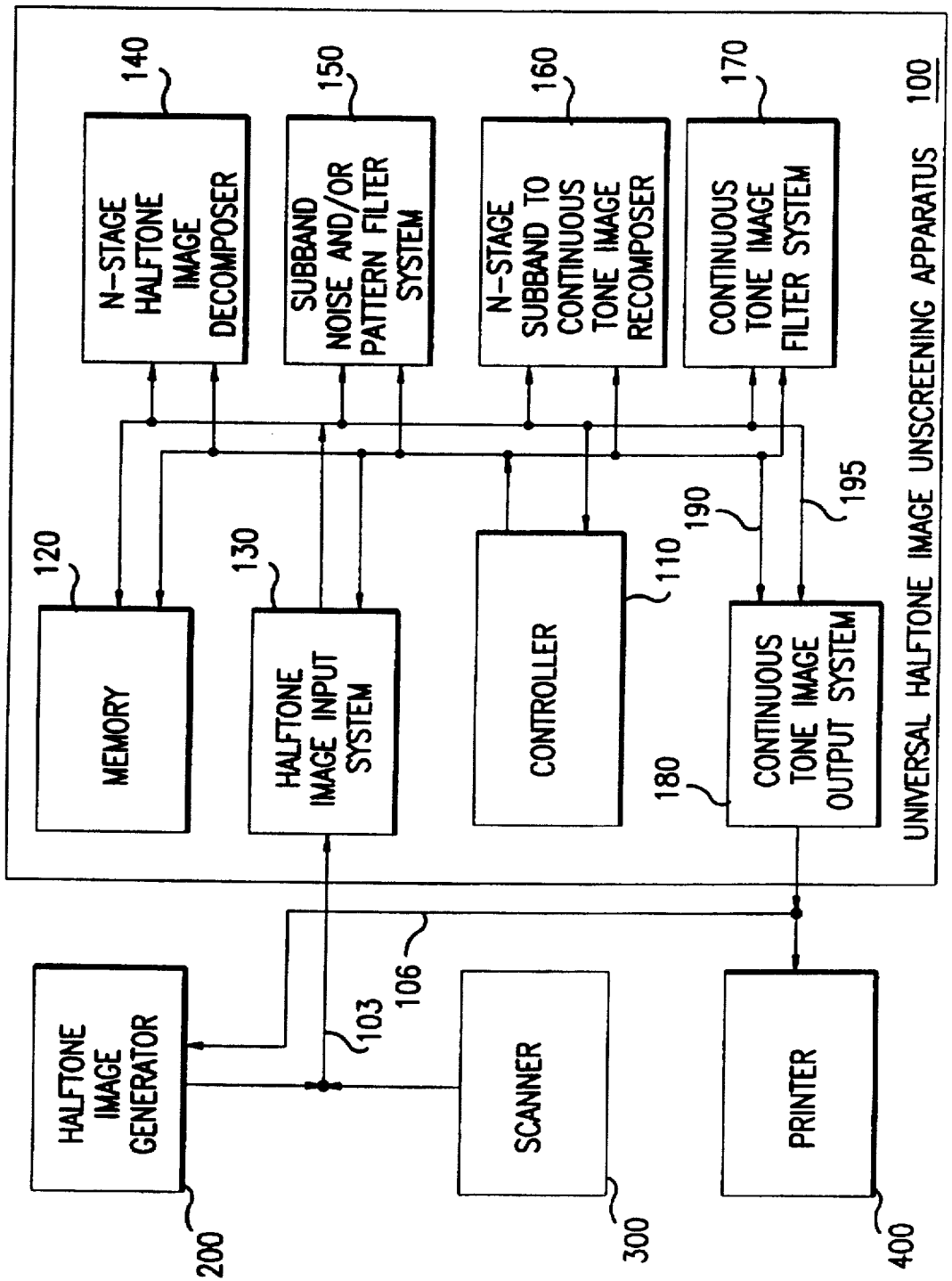
FIG. 3 is one preferred embodiment of the universal halftone image unscreening apparatus of FIG. 3.

As shown in FIG. 3, these images could have been formed by a halftone image generator 200, such as a computer programmed to generate halftone images for printing on a binary printer or the like. Such images, which are formed and stored as electronic data, where the electronic data will be directly input to the universal halftone image on the screening apparatus 100, will be referred to as electronic halftone images. In general, the halftone image generator 300 can be any halftone image source.

Figure 25:
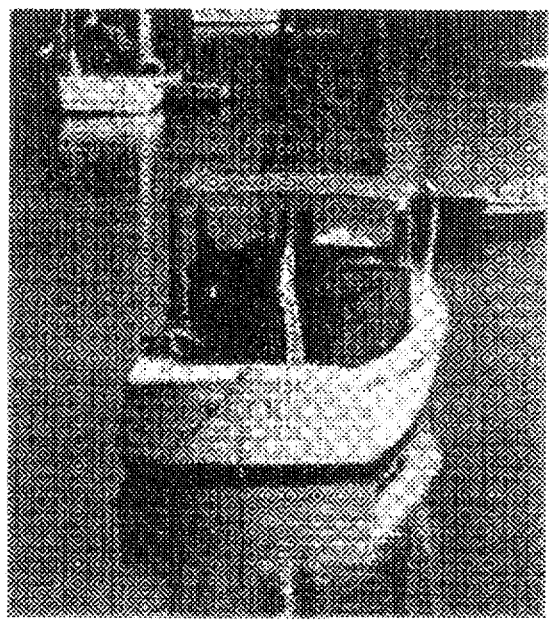
FIG. 25 shows a scanned halftone image.

In contrast, as shown in FIG. 25, a halftone image can be printed on a binary printer and later scanned by a scanner 300 to generate the input data for the universal halftone image unscreening apparatus 100. In the scanned halftone image shown in FIG. 25, the original image resolution was 400×400 pixels. The original image was scaled by a factor of 2 and halftoned using 4×8 cluster dots. The halftone image was printed at 300 spi and was then scanned at 200 spi.

In either case, whether the halftone image to be processed is an original electronic halftone image or is a scanned halftone image, the image is input from either the halftone image generator 200 or the scanner 300 over an input line 103 to a halftone image input system 130 of the universal halftone image unscreening apparatus 100.

In general, in one preferred embodiment of this invention, the universal halftone image unscreening apparatus 100 includes a controller 110, a memory 120, the halftone image input system 130, and N-stage halftone image decomposer 140, a subband noise and/or pattern filter system 150, a N-stage subband to continuous tone image recomposer 160, a continuous tone image filter system 170 and a continuous tone image output system 180. Each of these elements is interconnected by a control bus 190 and a data bus 195. The universal halftone image unscreening apparatus 100 is preferably implemented on a programmed general purpose computer. However, the universal halftone image unscreening apparatus 100 can also be implemented on a special purpose computer, a programmed microprocessor or microcontroller and peripheral integrated circuit elements, and ASIC or other integrated circuit, a hardwired electronic or logic circuit such as a discrete circuit element, a programmable logic device such as a PLD, PLA or PAL, or the like. In general, any device which is capable of implementing the flowcharts shown in FIGS. 11–16 can be used to implement the universal halftone image unscreening apparatus 100.

The halftone image input system 130 can be a LAN connection to a network, a modem connected by the public switch telephone network to a mainframe computer, a minicomputer, or a personal computer, a parallel or serial port connected to the scanner 300, or the like. After the halftone image data is input to the universal halftone image unscreening apparatus 100 through the halftone image input system 130, the halftone image data is stored to the memory 120.

The memory 120 can include both writable memory, such as RAM, flash memory, PROM, EPROM and EEPROM, and nonwritable memory, such as ROM. Preferably, the RAM is static or dynamic RAM. However, the memory 120 can also be implemented using a floppy disk and disk drive, a writable optical disk and disk drive, a hard drive, or the like.

After the original halftone image is stored in the memory 120, it is output to the N-stage halftone image decomposer 140 where it is decomposed into a plurality of subband image levels, where each subband image level comprises a plurality of subband images. Once the original halftone image has been decomposed by the N-stage halftone image decomposer into subband images, the subband images are stored in the memory 120. The subband images are then output to the subband noise and/or pattern filter system 150 to filter the halftone energy out of the subband images. The filtered subband images are then stored to the memory 120.

The stored filtered subband images are then output to the N-stage subband to continuous tone image recomposer 160, which recomposes the subband images back into an initial single, now contone, image. This initial contone image is then stored to the memory 120. The initial contone image is then read from the memory 120 and output to a continuous tone image filter system 170. The continuous tone image filter 170 filters the original contone image to form an enhanced contone image. The initial contone image is enhanced preferably using a nonlinear filter with spatial smoothness constraints or other edge-preserving filtering methods to smooth the initial contone image and remove any filtering or recomposition artifacts. The final contone image is then stored to the memory 120.

When the final contone image is to be printed, it is output from the memory 120 to the continuous tone image output system 180. The continuous tone image output system 180 outputs the final contone image to a printer 400, the halftone image generator 200 or some other device, such as a computer, a data storage device or the like, over an output line 106.

Furthermore, instead of being printed, the final contone image can be further processed. This further processing can include compression, image recognition, rescreening using a different halftone process or different halftoning parameters, and various image manipulation processes. These various image manipulation processes can include enlarging, reducing, flipping, rotating, and the like. While such image manipulation processes can be applied to the original halftone image, they can generally be more easily or generally applied to the descreened contone image. For example, a wider range of rotation angles can be used with the contone image.

Accordingly, it should be appreciated that the continuous tone image output system 180 can be a parallel or serial printer port, a LAN connection, a modem or the like.

Similarly, the device receiving the contone image can be any device capable of performing any of the functions outline above.

It should thus be appreciated that in many implementations of the universal halftone image unscreening apparatus 100, the continuous tone image output system 180 and the halftone image input system 130 will in fact be the same device and the input and output lines 103 and 106 will in fact be the same line. It should also be appreciated that it is not strictly necessary to store the processed image output from each of the halftone image input system 130, the N-stage halftone image decomposer 140, the subband noise and/or pattern filter system 150, the N-stage subband into continuous tone image recomposer 160 or the continuous tone image filter system 170. Rather, the subband images or contone image output from each of these subsystems can be input directly to the next downstream subsystem.

It should also be appreciated that, while FIG. 3 shows each of the subsystems as separate entities, in the programmed general purpose computer, the special purpose computer, the microprocessor, the microcontroller, the ASIC or the other devices that can be used to implement the universal halftone image unscreening apparatus 100 of this invention, the actual circuit elements implementing these subsystems are likely to be common to a plurality of, if not all of, the subsystems 110 and 130–180 of the universal halftone image unscreening apparatus 100.

In this preferred embodiment, the halftone image is decomposed into different frequency subband images using the discrete wavelet transform. The discrete wavelet transform and its inverse transform are fully described in *Wavelets and Subband Coding* by M. Vetterli and J. Kovacevic, Prentice Hall PTR (1995); *Wavelets and Filter Banks* by G. Strang and T. Nguyen, Wellesley-Cambridge Press (1996); and *Wavelet Basics* by Y. T. Chan, Kluwer Academic Publishers (1995), each incorporated herein by reference. The discrete wavelet transform is used because the unscreening process can be done more efficiently in the resulting subband images. While the energy of the halftoning process resides primarily in the high frequency subband images, the subband images with low frequency and at coarse resolutions primarily contain the signal energy.

Wavelet decomposition facilitates processing in both the frequency domain and the space domain. In the high frequency subband images, the signal energy and the halftoning energy are heavily mixed together. The high frequency subband images also contain signal energy corresponding to important edge information at edge locations. By using separate filter banks, the image is decomposed into quadtree structured subband images. Each of the quadtree structured subband images has a different orientation. For each given subband image level, there are three high frequency subband images, the "LH" subband image, the "HL" subband image and the "HH" subband image, which correspond to the horizontal orientation, the vertical orientation, and the diagonal orientation, respectively. At the coarsest resolution level, the subband images also include a low-pass frequency subband image, which is denoted as the "LL" subband image.

Figure 10:
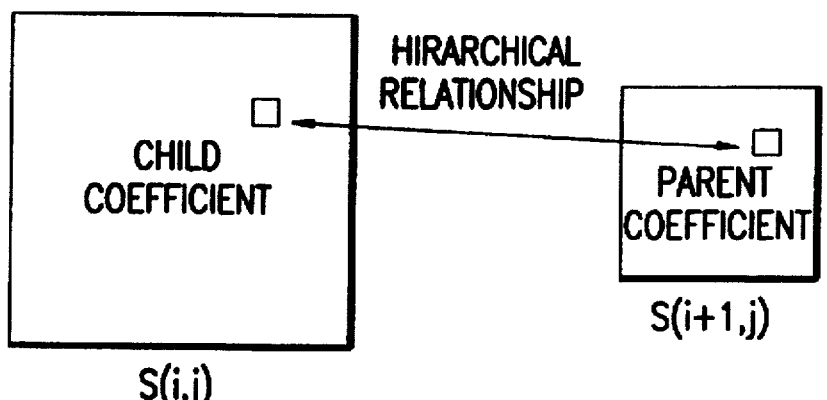
FIG. 10 shows the parent-child relationship between coefficients in subband images of adjacent levels.

A parent-descendent (or parent-child) relationship exists between the subband images at different resolution levels. This relationship is referred to as a "tree". This relationship is shown in FIG. 10. Each given coefficient of a subband image has four children at the same spatial location in the subband image of the same orientation at the next finer resolution. The exception is the low-pass LL subband image, where each coefficient has only three children. The parent-child relationship thus exists throughout the levels. In general, the magnitudes of the descendent coefficients are non-increasing relative to their parents. In other words, the power spectrum of the image decays as the frequency increases. Thus, if a coefficient is found to be insignificant in its magnitude, there is a high probability that its children will be insignificant as well.

For a large class of images, this assumption is generally valid. Violations of the tree constraint often indicates halftoning energy is present. That is, the presence of halftone energy is inconsistent with the spectrum characteristics of the image signal. Therefore, the coefficients of the high frequency subband images are clipped so that their magnitudes are not larger than the magnitudes of their parent coefficients. It should be appreciated that this tree-based clipping does not apply to the higher frequency subband images at the coarsest resolution, since these subband images generally contain mostly signal information and do not have high frequency parent subband images.

Accordingly, most of the halftone energy is suppressed or filtered out in the tree-based clipping process, except around edges. Since each high frequency subband image contains information primarily along its orientation, this can be used to further filter the remaining halftone noise from the image data. A one-dimensional low-pass filter is applied along the orientation of the vertically and horizontally oriented subband images. An X-shaped low-pass filter is applied to the diagonally oriented subband images. That is, the diagonal subband images are more heavily low-pass filtered, because they, in general, contain less signal information and more halftone noise. This second level of filtering is applied to all of the high frequency subband images, including those at the same coarsest resolution level as the low-pass LL subband image. Preferably, the oriented filtering is, for example, L-point running averaging.

Figure 18:
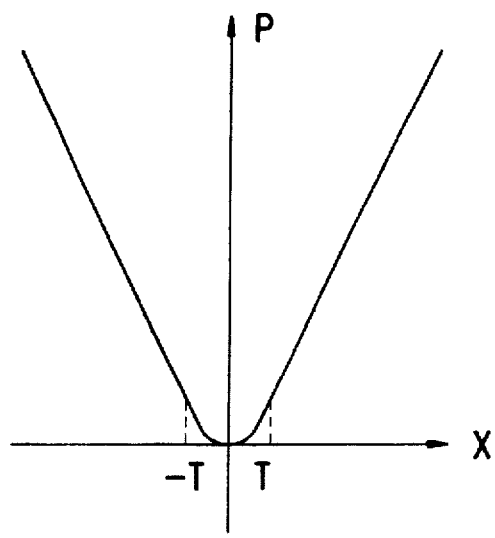
FIG. 18 shows the Huber minimax function.

In general, the initial recomposed contone image after the two subband image filtering stages will suffer from some fuzziness or blotchiness due to signal information loss. In particular, high frequency signal information loss results in "ringing" artifacts. Thus, the recomposed continuous tone image is preferably enhanced using a nonlinear filtering with the spatial smoothness constraints modeled by a Markov random field. The Markov random field is incorporated using a specific Gibbs potential function called the Huber minimax function. This function is shown in FIG. 18. The quadratic segment of this function facilitates the smoothing of discontinuities below the threshold T, while the linear segment preserves sharp edges. Such image enhancement techniques significantly reduce the artifacts while preserving the original image details. It should be appreciate that other edge-preserving filtering methods, such as σ-filter based filtering can also be used. σ-filter based filtering is described in "Digital Image Smoothing and the σ-Filter" by J. Lee, Computer Image Graphics and Image Processing, Vol. 24, pp. 255–269, 1983, herein incorporated by reference. In practice, the best results are obtained by sequentially processing the recomposed contone image with HMRF-based filtering and σ-filter based filtering.

Figure 4:
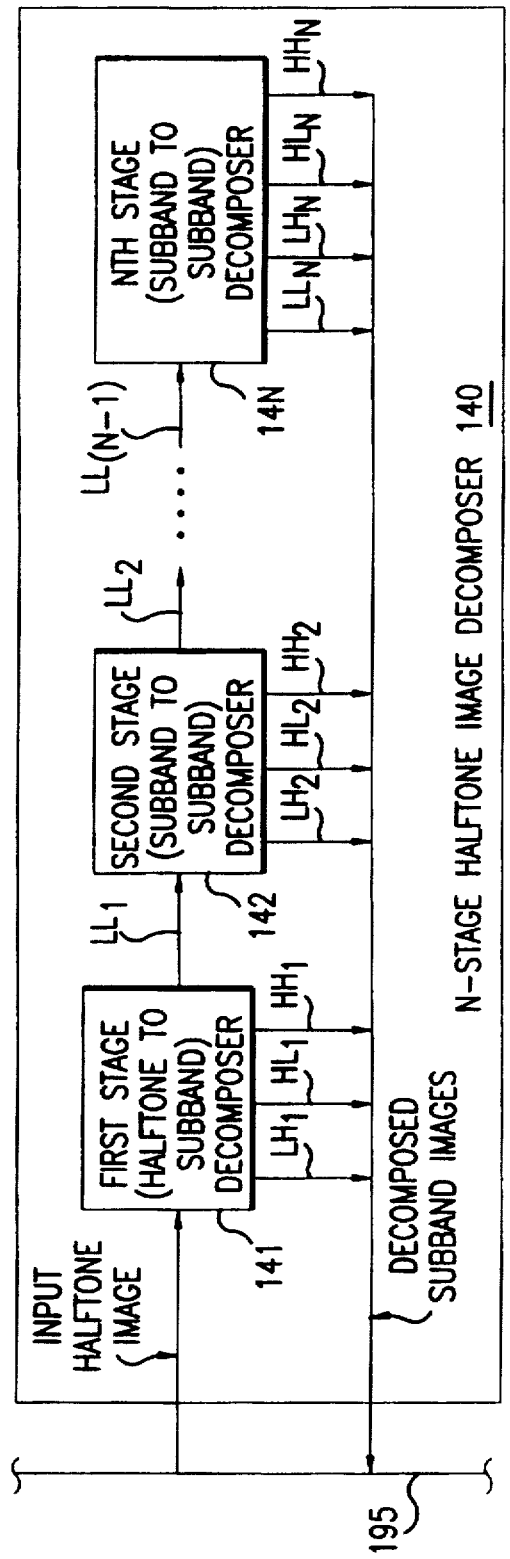
FIG. 4 is one preferred embodiment of the N-stage halftone image decomposer of FIG. 3.

Accordingly, as shown in FIG. 4, the N-stage halftone image decomposer 140 comprises a first stage (halftone to subband) decomposer 141, a second stage (subband to subband) decomposer 142 and so on to an Nth stage (subband to subband) decomposer. The input halftone image is input to the N-stage halftone image decomposer 140 over the data bus 195 to the first stage decomposer 141. The first stage decomposer 141 generates a low-pass $LL_1$ subband image and three high frequency $LH_1$, $HL_1$ and $HH_1$ subband images, which are output as the decomposed subband images onto the data bus 195.

The low frequency $LL_1$ subband image is input to the second stage decomposer 142. The second stage decomposer decomposes the low frequency $LL_1$ subband image into a low frequency $LL_2$ subband image and three high frequency $LH_2$, $HL_2$ and $HH_2$ subband images. These high frequency subband images are also output on the data bus 195. This decomposition process continues, with each successive decomposer stage decomposing the LL subband image from the previous decomposer stage, until the Nth stage decomposer 14N. The low frequency $LL_N$ subband image, rather than being further decomposed, is output by the Nth stage decomposer 14N to the data bus 195 along with the three high frequency $LH_N$, $HL_N$ and $HH_N$ subband images.

Figure 5:
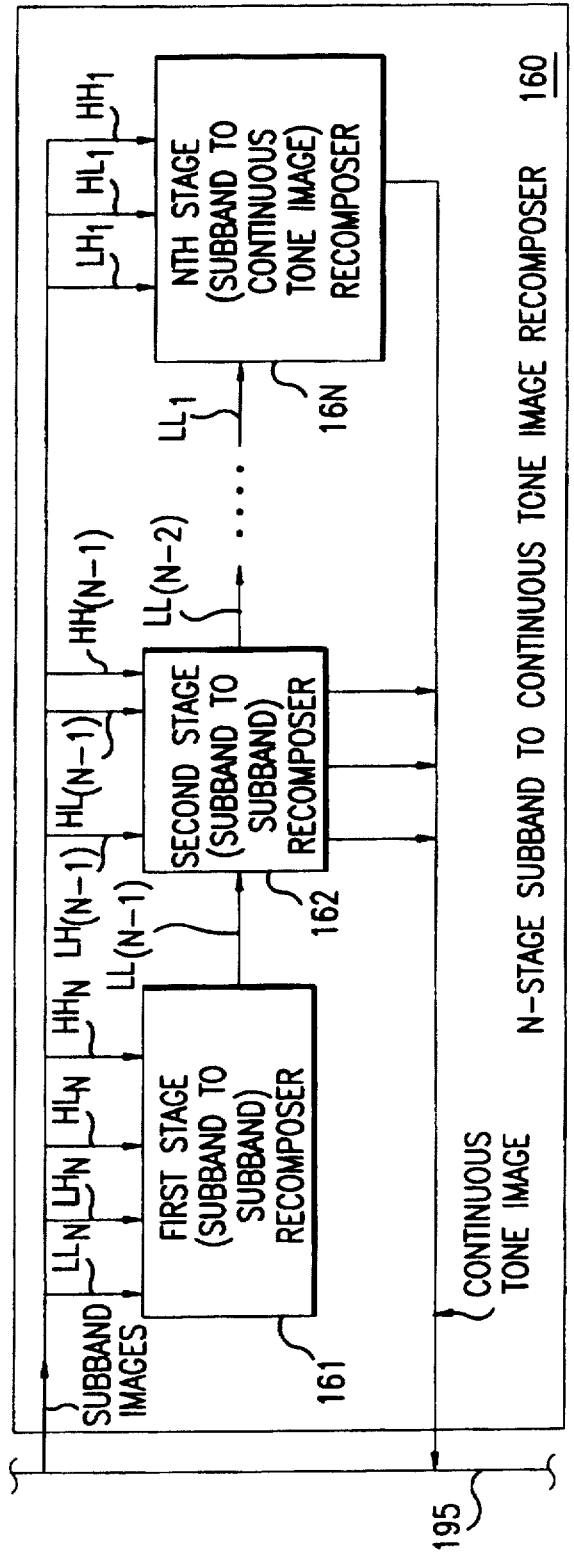
FIG. 5 is one preferred embodiment of the N-stage subband into continuous tone image recomposer of this invention.

Similarly, as shown in FIG. 5, the N-stage subband into continuous tone image recomposer 160 includes a first stage (subband to subband) recomposer 161, a second stage (subband to subband) recomposer 162 and so on to an Nth stage (subband to continuous tone image) recomposer 16N. As shown in FIG. 5, the subband images are input to the N-stage subband to continuous tone image recomposer 160 over the data bus 195. In particular, the high and low frequency $LL_N$, $LH_N$, $HL_N$ and $HH_N$ subband images are input to the first stage recomposer 161. The first stage recomposer 161 outputs a recomposed low frequency $LL_{(N-1)}$ subband image to the second stage recomposer 162. The second stage recomposer 162 also inputs the high frequency $LH_{(N-1)}$, $HL_{(N-1)}$ and $HH_{(N-1)}$ subband images. The second stage recomposer 162 recomposes these high and low frequency subband images and outputs a recomposed low frequency $LL_{N-2}$ subband image.

This recomposition process continues in successive recomposer stages until the Nth stage recomposer 16N. The Nth stage recomposer 16N inputs the recomposed low frequency $LL_N$ subband image from the (N−1)th stage (subband to subband) recomposer (not shown) and the high frequency $LH_1$, $HL_1$ and $HH_1$ subband images from the data bus 195 and outputs the initial continuous tone image. The N-stage subband to continuous tone image recomposer 160 then outputs the initial contone image to the data bus 195.

Figure 6:
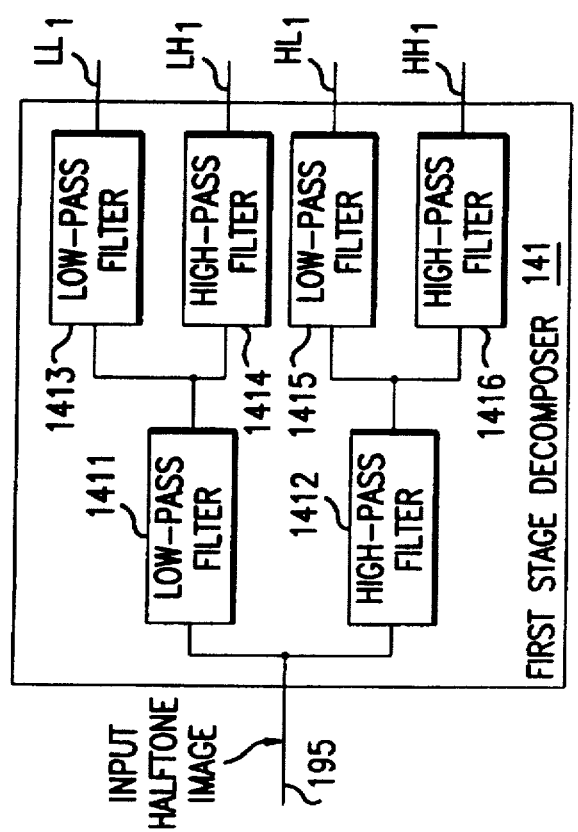
FIG. 6 is one preferred embodiment of the first stage decomposer of FIG. 4.

FIG. 6 shows in greater detail the structure of the first stage decomposer 141. In particular, the input halftone image input on the data bus 195 is input to each of a low-pass filter 1411 and a high-pass filter 1412. The output of the low-pass filter 1411 is input to each of a low-pass filter 1413 and a high-pass filter 1414. Similarly, the output of the high-pass filter 1412 is input to each of a low-pass filter 1415 and a high-pass filter 1416. The output of the low-pass filter 1413 is the low-pass $LL_1$ subband image, while the output of the high-pass filter 1414 is the high frequency $LH_1$ subband image. Similarly, the output of the low-pass filter 1415 is the high frequency $HL_1$ subband image, while the output of the high-pass filter 1416 is the high frequency $HH_1$ subband image. It should be appreciated that the same structure for the first stage decomposer 141 is used in each of the second-Nth stage decomposers 142–14N.

Figure 7:
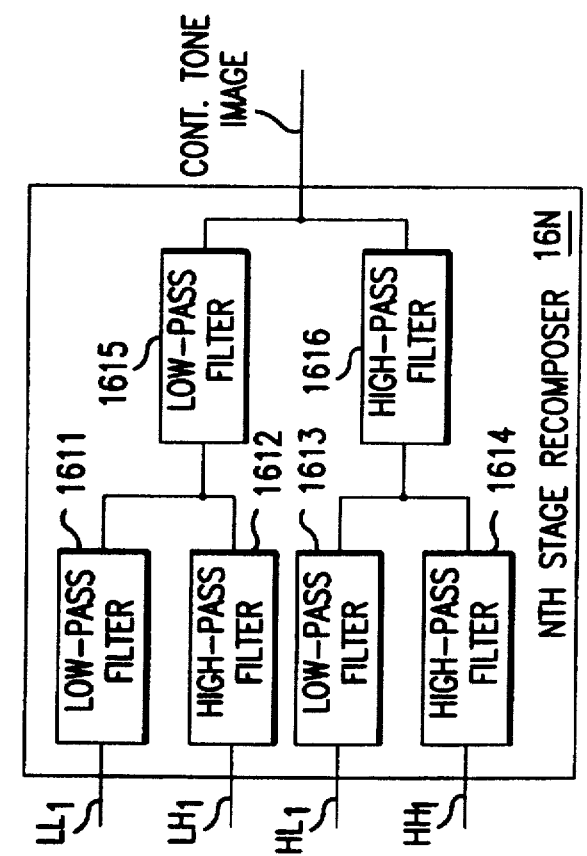
FIG. 7 is one preferred embodiment of the Nth stage recomposer of FIG. 5.

Similarly, FIG. 7 shows the preferred structure for the Nth-stage recomposer 16N. As shown in FIG. 7, the low frequency $LL_1$ subband image is input to a low-pass filter 1611. The high frequency $LH_1$ subband image is input to a high-pass filter 1612. The output of the low-pass filter 1611 and the high-pass filter 1612 are combined and output to a low-pass filter 1615. Similarly, the high frequency $HL_1$ subband image is input to a low-pass filter 1613, while the high frequency $HH_1$ subband image is input to a high-pass filter 1614. The output of the low-pass filter 1613 and the high-pass filter 1614 are combined and input to a high-pass filter 1616. The outputs of the low-pass filter 1615 and the high-pass filter 1616 are combined and output as the continuous tone image. It should be appreciated that each of the first-(N−1)th stages of the N-stage subband into continuous tone image recomposer 160 preferably have the same structure. In each of those stages, the output from the low-pass filter 1615 and the high-pass filter 1616, rather being the continuous tone image, is the low frequency LL subband image.

Figure 8:
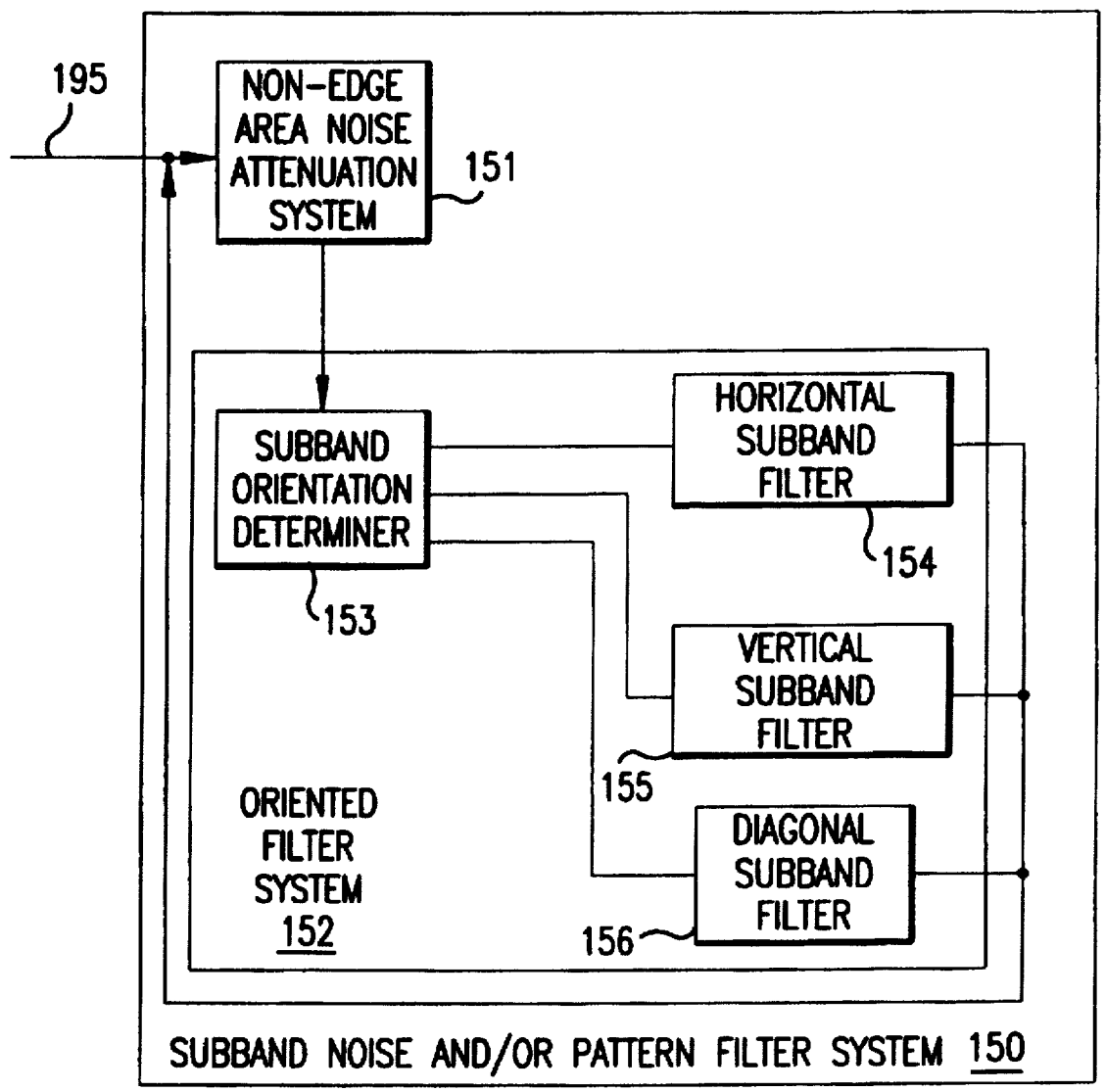
FIG. 8 is one preferred embodiment of the subband noise and/or pattern filter system of FIG. 3.

FIG. 8 shows the preferred structure for the subband noise and/or pattern filter system 150 in greater detail. In particular, the subband images generated by the N-stage halftone image decomposer 140 are input over the data bus 195 to a non-edge area noise attenuation system 151. As set forth above, this non-edge area noise attenuation system 151 is preferably a tree clipper. The output of the non-edge area noise attenuation system 151 is output to an oriented filter system 152.

As shown in FIG. 8, the oriented filter system 152 preferably includes a subband orientation analyzer 153 which inputs the output from the non-edge area noise attenuation system 151 and determines the orientation for each of the subband images generated by the N-stage halftone image decomposer 140. The horizontal subband images are output to the horizontal subband filter 154, while the vertical subband images are output to the vertical subband filter 155 and the diagonal subband images are output to the diagonal subband filter 156. The horizontal subband filter 154 preferably applies a vertical low-pass filter to the horizontal subband images, while the vertical subband filter 155 preferably applies a horizontal low-pass filter to the vertical subband images. An X-shaped low-pass filter is preferably applied by the diagonal subband filter 156 to the diagonal subband images. The outputs of the horizontal, vertical and diagonal subband filters 154–156 is output by the subband noise and/or pattern filter 150 on the data bus 195 to either the memory 120 or the N-stage subband to continuous tone image recomposer 160.

Figure 9:
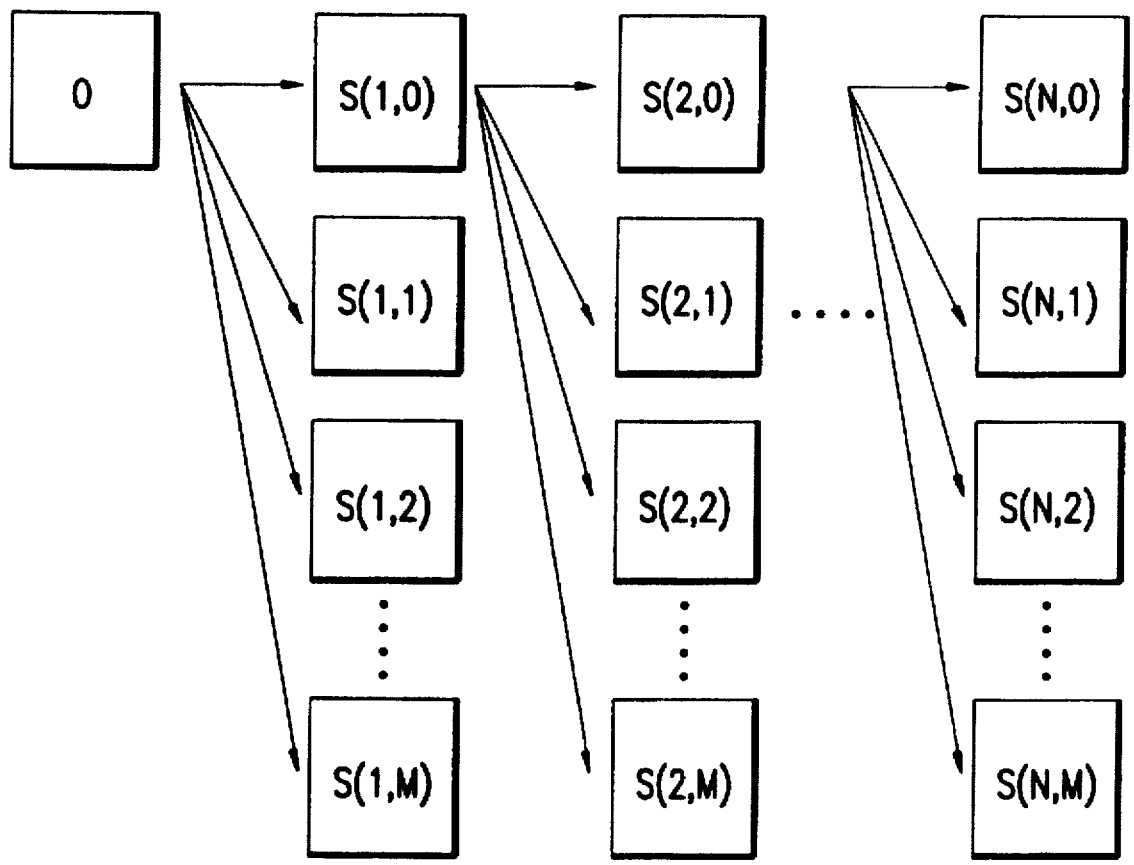
FIG. 9 graphically shows how the original image is iteratively decomposed into subband images.

FIG. 9 graphically shows the general relationship between the original image "O" and each of the subband images "S". In particular, as shown in FIG. 9, the original image O is decomposed into up to m first level subband images S(1,0) to S(1,M). Then, the 0th subband image of each level, i.e. the S(n,0) subband image is decomposed into up to m second level subband images S(2,0) to S(2,M). This continues until the nth level, comprising the subband images S(N,0) to S(N,M), is formed.

After the subband images are processed to apply whatever filtering is desired, the continuous tone image is created by reversing this process. While the wavelet based unscreening apparatus and method of this invention generates four subband images in each level, the method outlined in FIG. 9 is not so limited. This is because the universal halftone image unscreening apparatus and method of this invention are not limited to the discrete wavelet transform. Rather, cosine transforms (including the discrete cosine transform), lapped transforms, Fourier transforms, and wavelet transforms without subsampling, among others, can be used in the universal halftone image unscreening apparatus and method of this invention.

Figure 11:
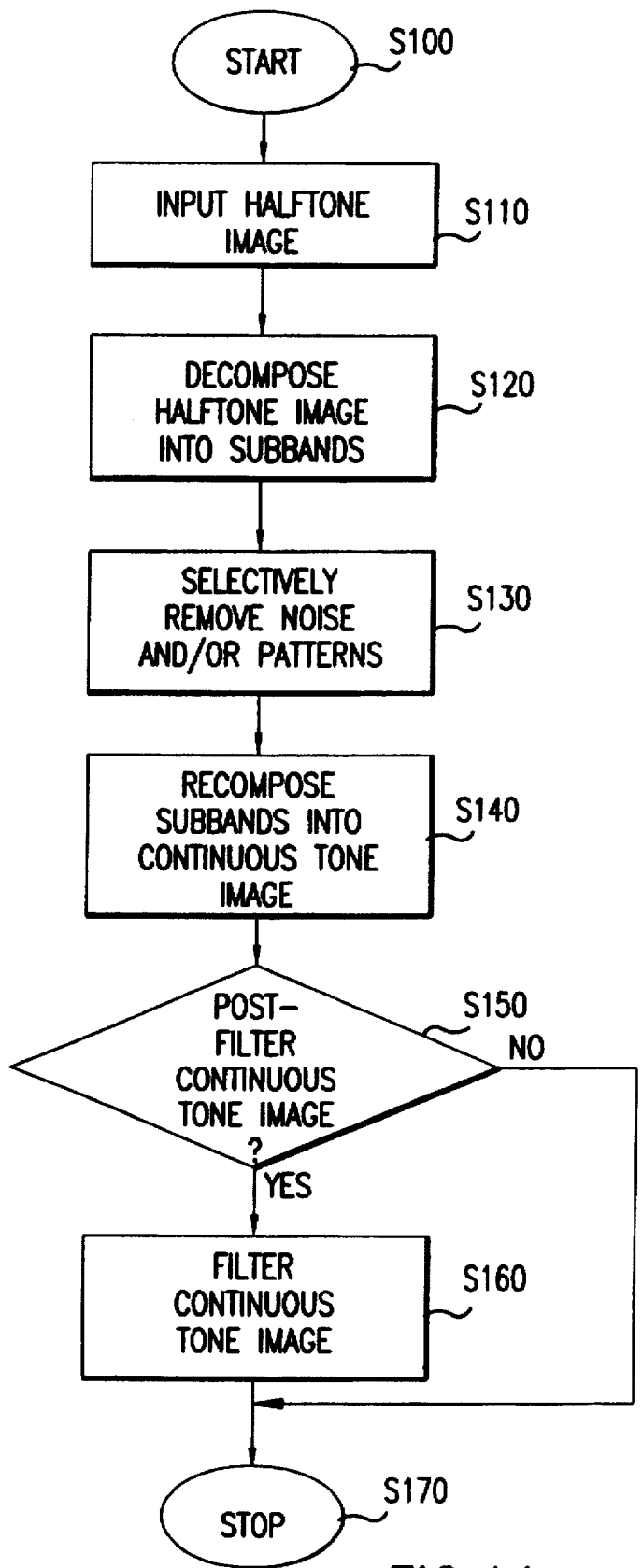
FIG. 11 is a flowchart showing one preferred embodiment of the method of this invention.

Accordingly, the most general method of this invention is shown in FIG. 11. After starting in step S100, the control system implementing the flowcharts of FIGS. 11–15 inputs the halftone image in step S110. Then, in step S120 the halftone image is decomposed into subband images. Next, in step S130, noise and/or patterns are selectively removed from the subband images. Then, in step S140, the subband images are recomposed into an initial continuous tone image.

Next, in step S150, the control system determines if post filtering of the initial continuous tone image is necessary, desirable or requested. If post filtering is to be performed, control continues to step S160, where the initial continuous tone image is filtered to produce the final continuous tone image. Control then continues to step S170. If, in step S150, post filtering is not to be performed, control jumps directly to step S170. In step S170, the process stops.

Figure 12:
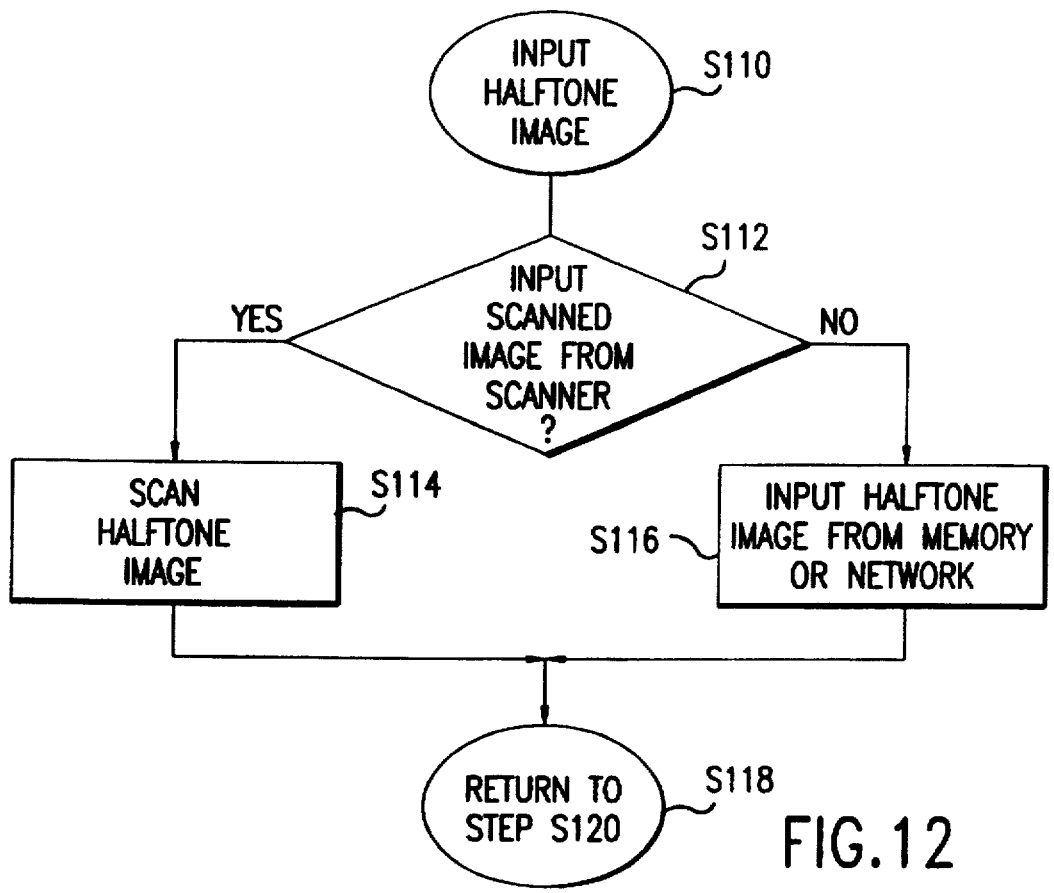
FIG. 12 shows the halftone image inputting step of FIG. 11 in greater detail.

FIG. 12 shows the halftone image inputting step S110 in greater detail. In particular, in step S112, the control system determines if the halftone image is to be scanned and input from a scanner. If it is, control continues to step S114, where the halftone image is scanned and input. Otherwise, control continues to step S116, where the halftone is input as electronic halftone image from a network or host computer, over a modem, from memory or the like. From either step S114 or step S116, control continues to step S118, which returns control to step S120.

Figure 13:
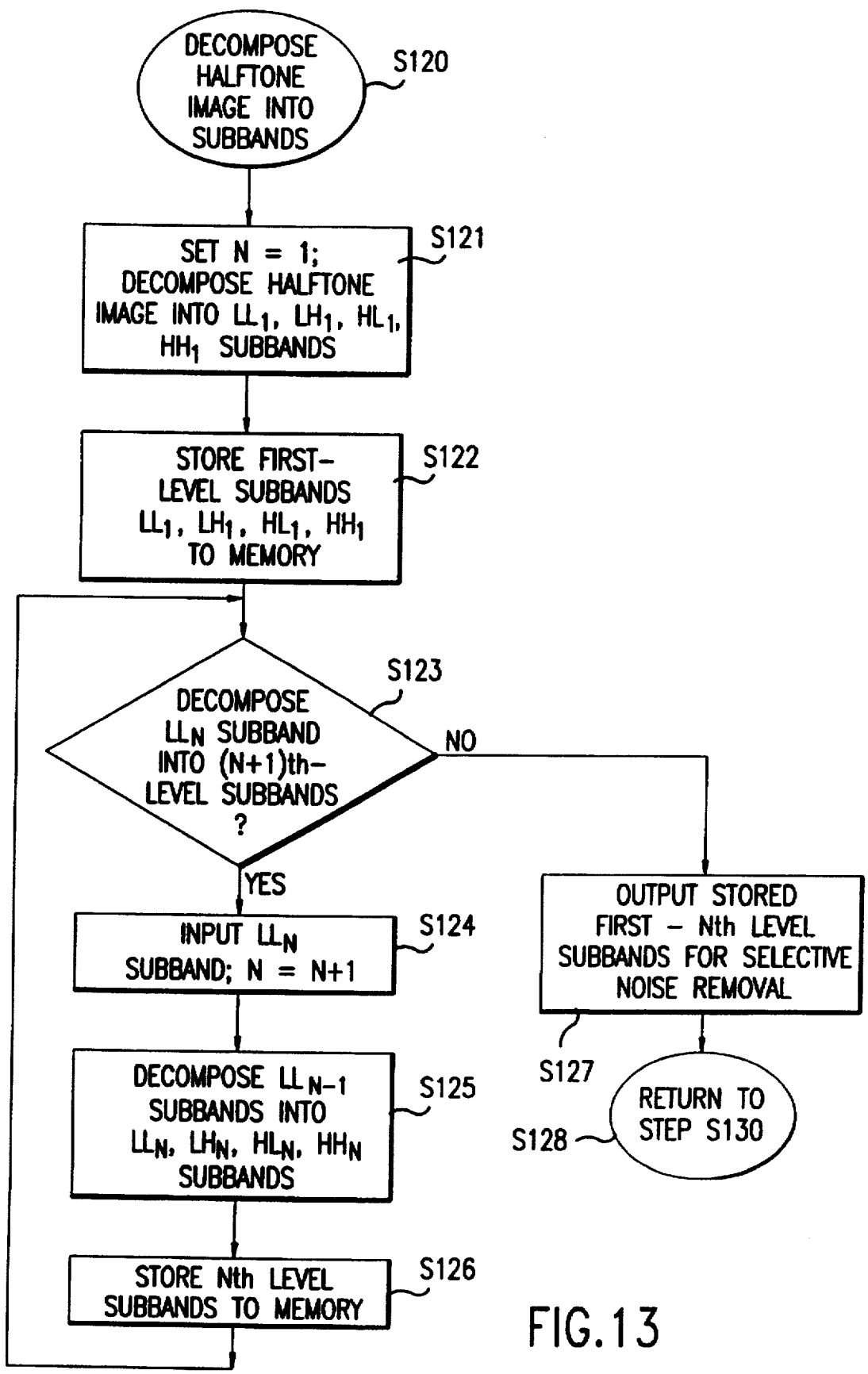
FIG. 13 shows the halftone image decomposing step of FIG. 11 in greater detail.

FIG. 13 shows the halftone image decomposing step of S120 in greater detail. In particular, FIG. 13 shows the preferred method of step S120 when the discrete wavelet transform is used to decompose the original halftone image. It should be appreciated that the steps shown in FIG. 13 for step S120 will be highly dependent upon the particular method used to decompose the halftone image.

In particular, in step S121, a counter N is set to 1 and the original halftone image is decomposed into the $LL_1$, $LH_1$, $HL_1$ and $HH_1$ subband images. Then, in step S122, these subband images are stored to memory. Next, in step S123, the control system determines if the current low frequency $LL_N$ subband image (where N here =1) is to be further decomposed into (N+1)th level subband images. If not, control jumps directly to step S127. Otherwise, control continues to step S124.

In step S124, the low frequency $LL_N$ subband image is input from memory and the value of N is incremented by 1. Then, in step S125, the input low frequency subband image, which is now the low frequency $LL_{(N-1)}$ subband image, is decomposed into the next level $LL_N$, $LH_N$, $HL_N$ and $HH_N$ subband images. These subband images are then stored to memory in step S126 and control returns to step S123. The control system continues to loop through steps S123–S126 until all of the subband image levels have been formed. Control then continues to step S127.

In step S127, the stored first-Nth level subband images are output for selective noise and/or pattern removal. Control then continues to step S128, which returns control to step S130. It should also be appreciated that the subband images need not be stored to memory. In this case, rather than storing the subband images to memory in steps S122 and S126, the low frequency $LL_N$ subband images formed in step S121 and S125 are directly input to step S124 if additional subband images are to be formed in step S123.

Figure 14:
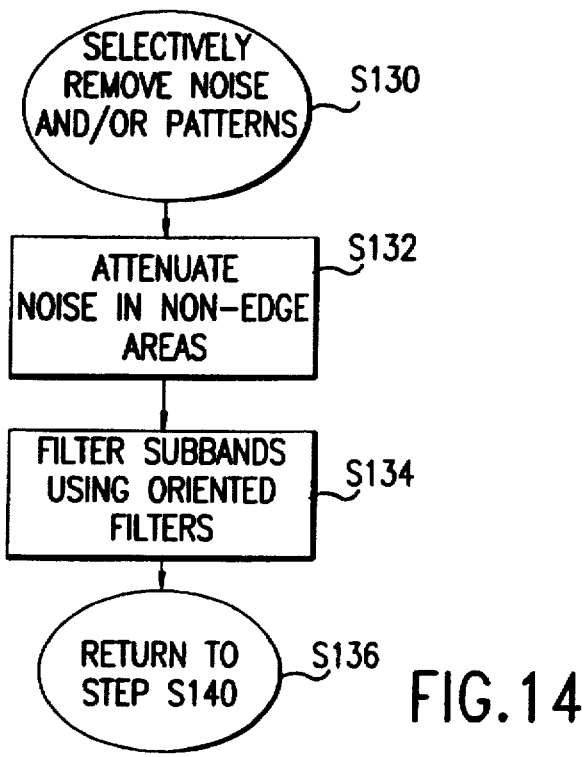
FIG. 14 shows the selective noise and/or pattern removing step of FIG. 11 in greater detail.

FIG. 14 shows in greater detail the selective noise and/or pattern removing step S130. In particular, in step S132, the noise in non-edge areas of the subband images is attenuated. Then, in step S134, the subband images are filtered using oriented filters. Then, in step S136, control is returned to step S140.

Figure 15:
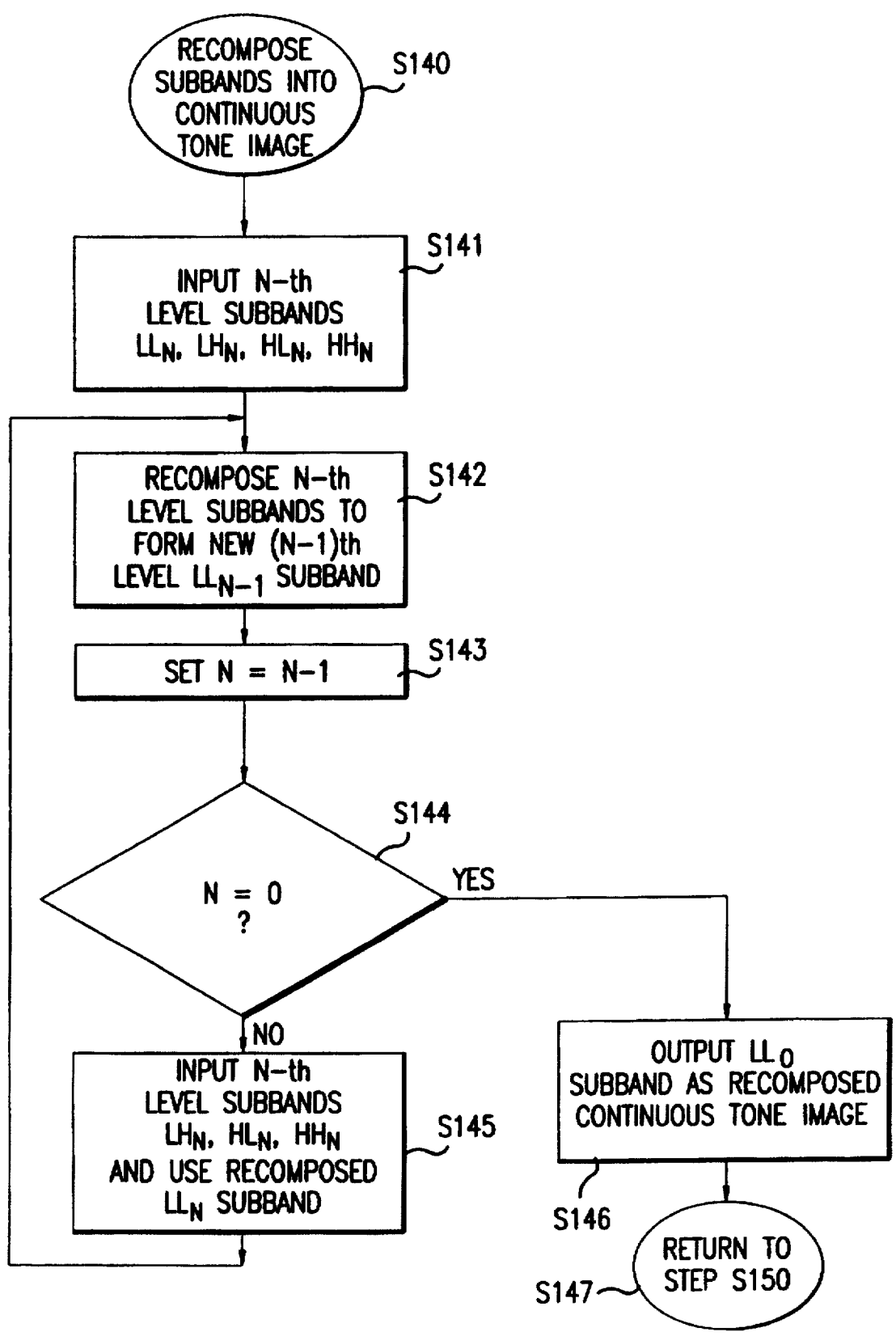
FIG. 15 shows the continuous tone image recomposing step of FIG. 11 in greater detail.

FIG. 15 shows the continuous tone image recomposing step S140 in greater detail. In particular, in step S141, the Nth level $LL_N$, $LH_N$, $HL_N$ and $HH_N$ subband images are input from memory. Then, in step S142, the Nth level subband images are recomposed to form a new (N−1)th level low frequency $LL_{(N-1)}$ subband image. Then, in step S143, the value of N, which was incremented in step S124, is decremented by 1. Control then continues to step S144.

In step S144, the control system determines if N is equal to 0. If not, control continues to step S145, where, based on the new value for N, the Nth level high frequency $LH_N$, $HL_N$ and $HH_N$ subband images are input and associated with the recomposed low frequency $LL_N$ subband image. Control then returns to step S142, where the subband images are again recomposed to form the next higher level low frequency LL subband image.

This loop through steps S142–S145 continues until, in step S144, N=0. At that point, control continues to step S146, where the "$LL_0$" image, i.e. the recomposed contone image, is output to memory. Then, in step S147, control returns to step S150.

Figure 16:
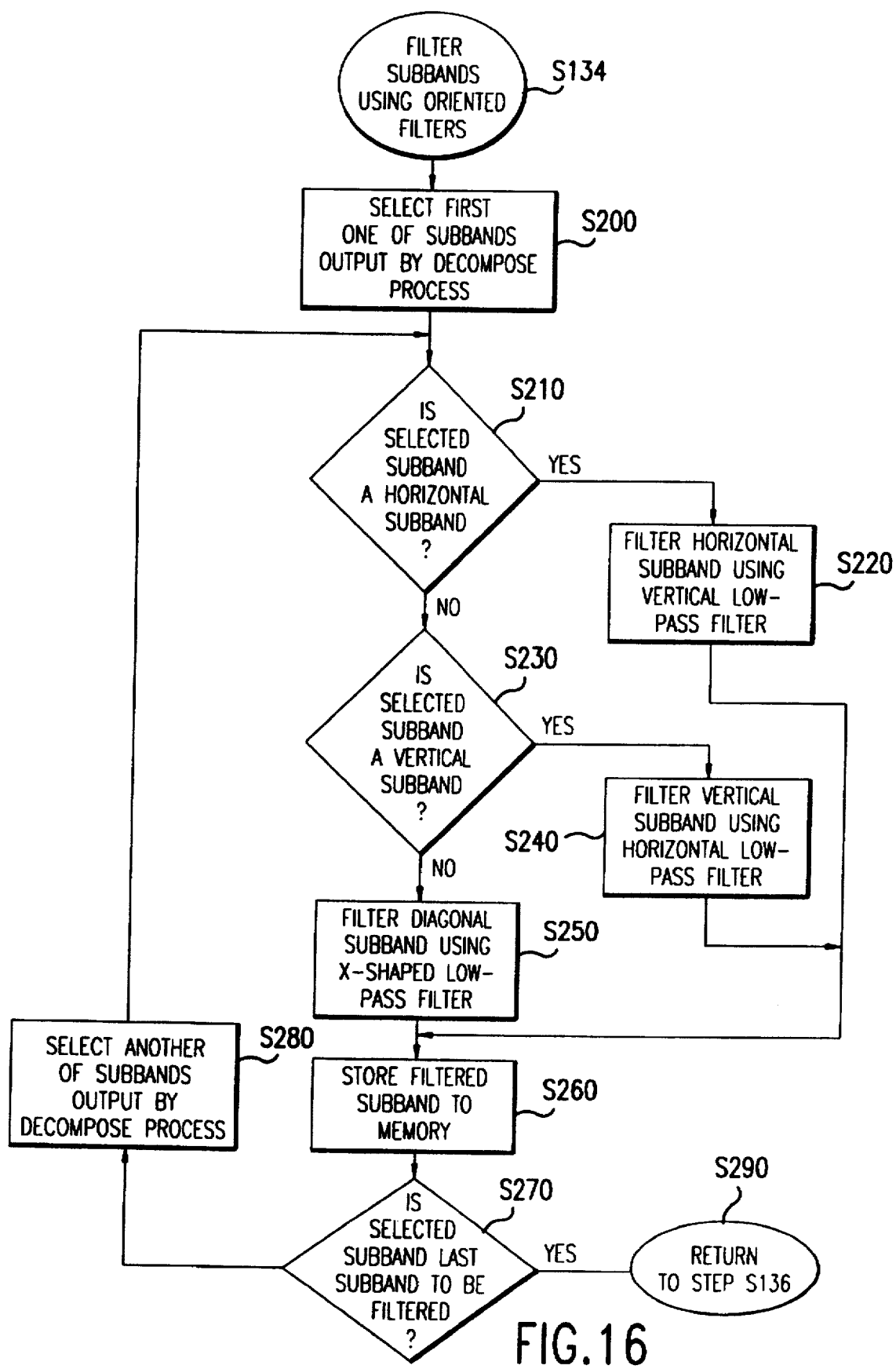
FIG. 16 shows the subband images filtering using oriented filters step of FIG. 14 in greater detail.

FIG. 16 shows one preferred embodiment for the subband image filtering using oriented filters step S134. In particular, in step S200, a first one of the subband images output or generated by the decompose process is selected. Then, in step S210, the control system determines if the selected subband image is a horizontal subband image. If not, control continues to step S230. Otherwise, control continues to step S220. In step S220, the horizontal subband image is filtered using a vertical low-pass filter. Control then continues to step S260. In step S230, the control system determines if the selected subband image is a vertical subband image. If so, control continues to step S240, where the vertical subband image is filtered using a horizontal low-pass filter. Control then continues to step S260. Otherwise, if, in step S230, the selected subband image is not a vertical subband image, it is a diagonal subband image. Thus, control continues to step S250, where the diagonal subband image is filtered using an X-shaped low-pass filter. Control then continues to step S260.

In step S260, the filtered subband image is stored to memory. Then, control continues to step S270. In step S270, the control system determines if the selected subband image is the last subband image to be filtered. That is, the control system determines if all of the subband images have been filtered. If less than all of the subband images have been filtered, control continues to step S280 where another of the subband images is selected. Control then returns to step S210. Otherwise, if all the subband images have been filtered, control continues to step S290, which returns control to step S136.

Figure 17:
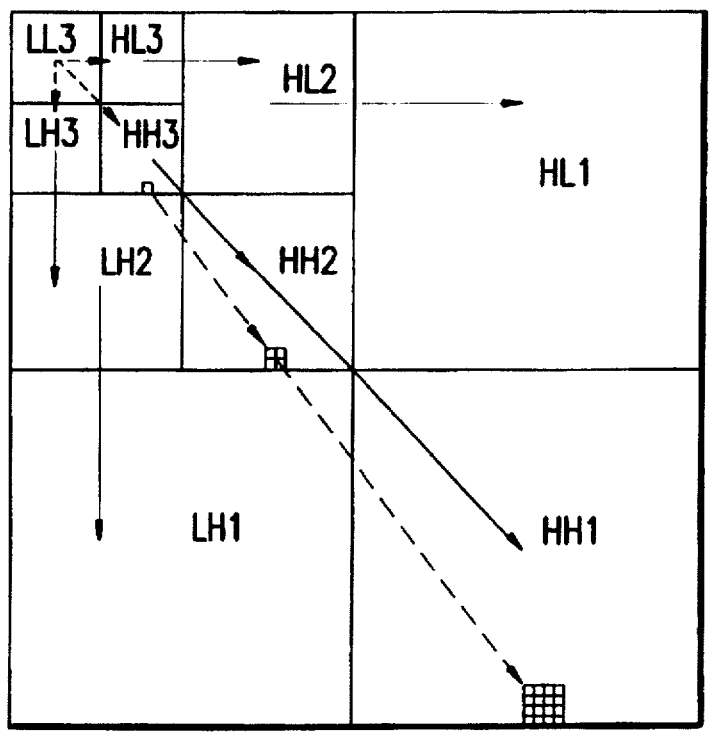
FIG. 17 shows the parent-descendant relationship for the image coefficients for wavelet decomposition.
Figure 19:
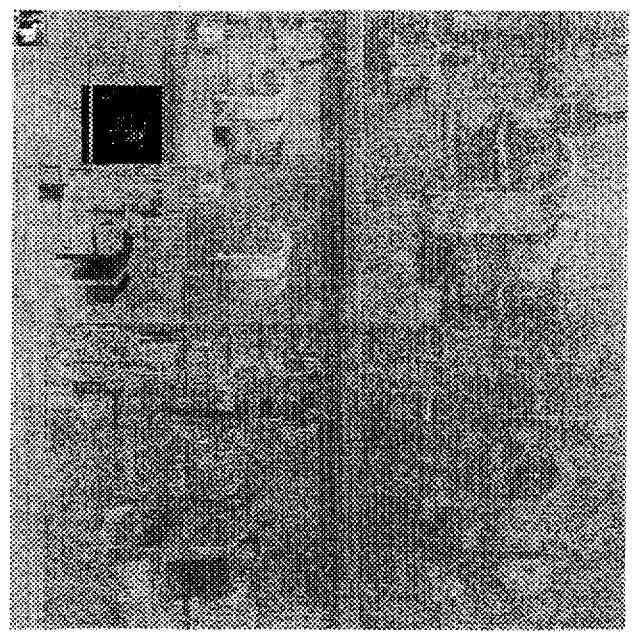
FIG. 19 shows the subband images formed by wavelet decomposition of the halftone image of FIG. 2.
Figure 20:
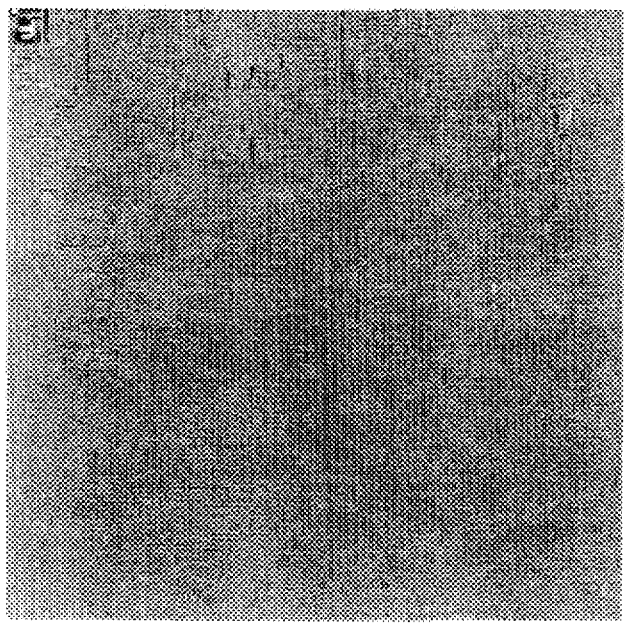
FIG. 20 shows the subband images of FIG. 19 after tree clipping.

FIG. 17 shows the relationship of each of the subband images to their parent images and the parent-child relationship for the parent coefficients and the child coefficients. In FIG. 19 shows the resulting subband images when the halftone image decomposition step S120 of FIGS. 11 and 13 is applied to the clustered-dots halftone image of FIG. 2. FIG. 20 shows the subband images after the non-edge area noise attenuation step S132 has been applied to the subband images shown in FIG. 19. In particular, in the noise attenuated subband images shown in FIG. 20, step S132 is implemented by tree clipping.

Figure 21:
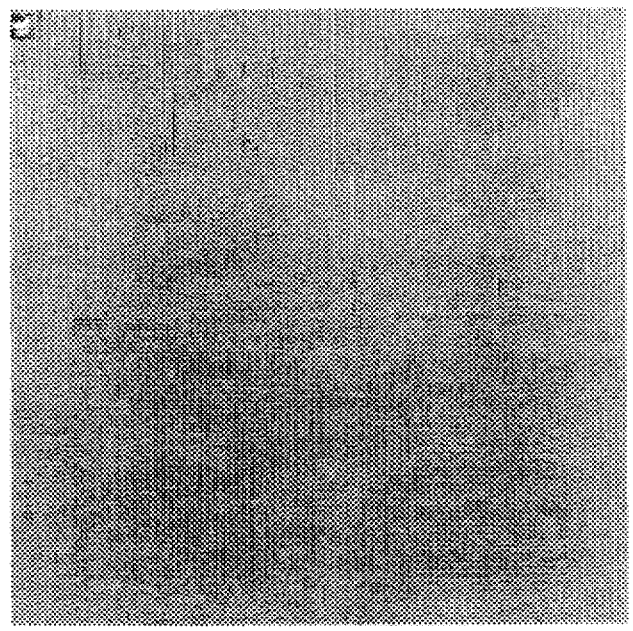
FIG. 21 shows the subband images of FIG. 20 after oriented filtering.
Figure 22:
FIG. 22 shows the initial continuous tone image of FIG. 21 after wavelet recomposition of the filtered subband images.

Next, FIG. 21 shows the subband images after the subband filtering using oriented filters step S134 shown in FIGS. 14 and 16 has been applied to the noise attenuated subband images shown in FIG. 20. FIG. 22 shows the initial recomposed contone image recomposed from the filtered subband images shown in FIG. 21 based on the subband into continuous tone image recomposition step S140 shown in FIGS. 11 and 15.

FIG. 23 shows the final contone image formed by applying the continuous tone image filtering step S160 of FIG. 11 to the initial contone image shown in FIG. 22. FIG. 24 shows the similar final contone image resulting from applying the process outlined in FIG. 11 to the error diffused halftone image shown in FIG. 1.

Figure 26:
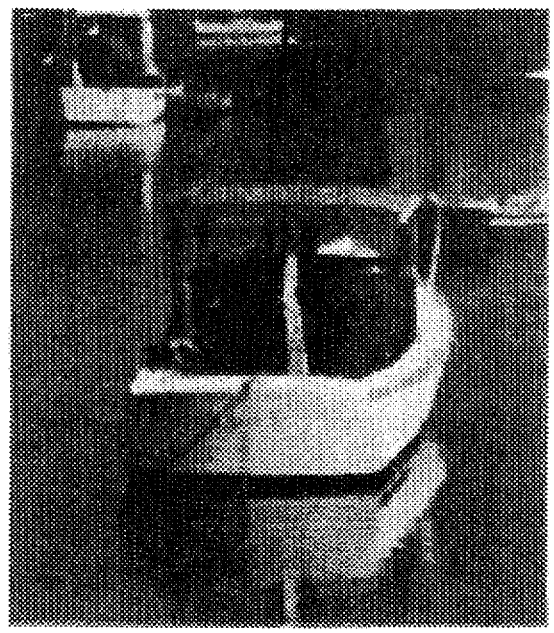
FIG. 26 shows the final continuous tone image of the scanned halftone image of FIG. 25.

FIG. 25, as outlined above, shows the same image as that shown in FIGS. 1 and 2 after having been printed and scanned. That is, the images shown in FIGS. 1 and 2 were input to the universal unscreening apparatus and method of this invention as electronic images directly generated from a halftone image generator. In contrast, the image shown in FIG. 25 was input to the universal unscreening apparatus and method of this invention by scanning a printed halftone image. FIG. 26 shows the resulting contone image generated by applying the steps of FIG. 11 to the scanned halftone image shown in FIG. 25. As a comparison of FIGS. 23, 24 and 26 shows, the method outlined in FIG. 11 is able to generate a high quality contone image independently of the halftoning method used and independently of the image being either an electronic halftone image or a scanned halftone image.

It should also be appreciated that the contone images of FIGS. 23, 24 and 26 were generated without any initial knowledge concerning any of the halftone and/or scanning parameters used to generate and/or input the original halftone image into the universal halftone image unscreening apparatus 100. However, it should be appreciated that if such information is available or estimated, the method outlined in FIGS. 11–16 can be easily altered to make use of such information. In particular, "Inverse Halftoning and Kernel Estimation for Error Diffusion" by P. W. Wong, outlined above and herein incorporated by reference, discloses one method for making use of such information.

It should also be appreciated that the oriented filtering outlined above can be performed by convolution with the following types of masks for vertical, horizontal, and diagonal oriented filtering, respectively:

| Vertical | Horizontal | Diagonal |
|---|---|---|
| 010 | 000 | 101 |
| 010 | 111 | 010 |
| 010 | 000 | 101. |

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for creating a continuous tone image from a halftone image, comprising:
    decomposing the halftone image into a plurality of subband images;
    selectively removing at least one of noise and patterns from the plurality of subband images; and
    recomposing the plurality of subband images into the continuous tone image.

2. The method for creating the continuous tone image from the halftone image of claim 1, further comprising filtering the continuous tone image using an edge-preserving filter to form an enhanced continuous tone image.

3. The method for creating the continuous tone image from the halftone image of claim 2, wherein the continuous tone image filtering step comprises non-linearly filtering the continuous tone image using spatial smoothness constraints modeled using a Huber Markov random field.

4. The method for creating the continuous tone image from the halftone image of claim 2, wherein the edge-preserving filter is a non-linear filter.

5. The method for creating the continuous tone image from the halftone image of claim 4, wherein the edge preserving filter is a σ-filter.

6. The method for creating the continuous tone image from the halftone image of claim 1, wherein the halftone decomposing step comprises decomposing the halftone image into a plurality of different frequency subband images based on a discrete wavelet transform.

7. The method for creating the continuous tone image from the halftone image of claim 1, wherein the halftone decomposing step comprises:
    decomposing the halftone image into a plurality of different first level frequency subband images;
    decomposing one of the plurality of first level subband images into a plurality of second level different frequency subband images; and
    repeating the subband image decomposing step for at least the plurality of second level subband images.

8. The method for creating the continuous tone image from the halftone image of claim 1, wherein the selectively removing step comprises:
    attenuating noise from non-edge areas of each of the plurality of subband images; and
    oriented filtering of each of the plurality of noise-attenuated subband images.

9. The method for creating the continuous tone image from the halftone image of claim 8, wherein the noise-attenuating step comprises clipping the magnitudes of the pixels of high frequency subband images.

10. The method for creating the continuous tone image from the halftone image of claim 8, wherein the noise-attenuating step comprises:
    weighting magnitudes of coefficients for a parent subband image for each high frequency subband image; and
    clipping magnitudes of coefficients of the high frequency subband images to at most the weighted magnitudes of the coefficients of the corresponding parent subband image.

11. The method for creating the continuous tone image from the halftone image of claim 10, wherein the magnitude weighting step comprises varying the weighing based on a level of the high frequency subband.

12. The method for creating the continuous tone image from the halftone image of claim 10, wherein the clipping step adapts to edges in the high frequency subband images.

13. The method for creating the continuous tone image from the halftone image of claim 8, wherein the oriented filtering step comprises applying a one-dimensional low-pass filter along an orientation of each subband image.

14. The method for creating the continuous tone image from the halftone image of claim 8, wherein oriented filtering step comprises applying one of a plurality of oriented filters to each of the subband images, the plurality of oriented filters comprising a horizontal low-pass filter, a vertical low-pass filter and a X-shaped low-pass filter.

15. The method for creating the continuous tone image from the halftone image of claim 8, wherein the oriented filtering step comprises:

applying a horizontal low-pass filter to vertical subband images;

applying a vertical low-pass filter to horizontal subband images; and applying a X-shaped low-pass filter to diagonal subband images.

16. The method for creating the continuous tone image from the halftone image of claim 8, wherein the oriented filtering step comprises adapting the oriented filtering to a resolution of the subband images.

17. The method for creating the continuous tone image from the halftone image of claim 16, wherein the oriented filtering step further comprises selecting appropriate filters based on estimates of the screen parameters.

18. An apparatus for converting a halftone image into a continuous tone image, comprising:

decomposing means for decomposing the halftone image into a plurality of subband images;

means for selectively removing at least one of noise and patterns from the plurality of subband images; and recomposing means for recomposing the plurality of subband images into the continuous tone image.

19. The apparatus for converting a halftone image into a continuous tone image of claim 18, further comprising means for filtering the continuous tone image.

20. An apparatus for converting a halftone image into a continuous tone image, comprising:

an N-stage halftone image decomposer;

a subband noise/pattern filter system; and an N-stage subband image recomposer.

21. The apparatus for converting a halftone image into a continuous tone image of claim 20, further comprising a continuous tone image filter system.

22. The apparatus for converting a halftone image into a continuous tone image of claim 20, wherein the N-stage halftone image decomposer comprises:

a halftone image to subband image decomposer; and at least one subband image to subband image decomposer.

23. The apparatus for converting a halftone image into a continuous tone image of claim 22, wherein the halftone image to subband image decomposer and each at least one subband image to subband image decomposer comprises:

a first low-pass filter and a first high-pass filter inputting one of the halftone image and a subband image;

a second low-pass filter and a second high-pass filter connected to an output of the first low-pass filter; and a third low-pass filter and a third high-pass filter connected to an output of the first high-pass filter.

24. The apparatus for converting a halftone image into a continuous tone image of claim 20, wherein the N-stage subband image recomposer comprises:

at least one subband image to subband image recomposer; and a subband image to continuous tone image recomposer.

25. The apparatus for converting a halftone image into a continuous tone image of claim 24, wherein the subband image to continuous tone image recomposer and each at least one subband image to subband image recomposer comprises:

a first low-pass filter, a second low-pass filter, a first high-pass filter and a second high-pass filter, each filter inputting a different one of a plurality of subband images of a previous subband image level;

a third low-pass filter connected to outputs of each of the first low-pass filter and the first high-pass filter; and a third high-pass filter connected to outputs of each of the second low-pass filter and the second high-pass filter;

wherein outputs of the third low-pass and third high-pass filters are combined to form one of a subband image of a current subband image level and the continuous tone image.

26. The apparatus for converting a halftone image into a continuous tone image of claim 20, wherein the subband noise/pattern filter system comprises:

a non-edge area noise attenuating filter; and a subband image oriented filter system.

27. The apparatus for converting a halftone image into a continuous tone image of claim 26, wherein the subband image oriented filter system comprises:

a subband image orientation analyzer; and a plurality of oriented filters;

wherein each of the subband images is filtered by one of the plurality of oriented filters based on an orientation of that subband image determined by the subband image orientation analyzer.

28. The apparatus for converting a halftone image into a continuous tone image of claim 27, wherein the plurality of oriented filters comprises:

a horizontal subband filter;

a vertical subband filter; and a diagonal subband filter.

* * * * *